Aug. 26, 1941.   H. ZIEBOLZ   2,254,098
PATTERN CONTROLLED MECHANISM FOR TOOLS AND THE LIKE
Filed Nov. 16, 1939   3 Sheets-Sheet 2

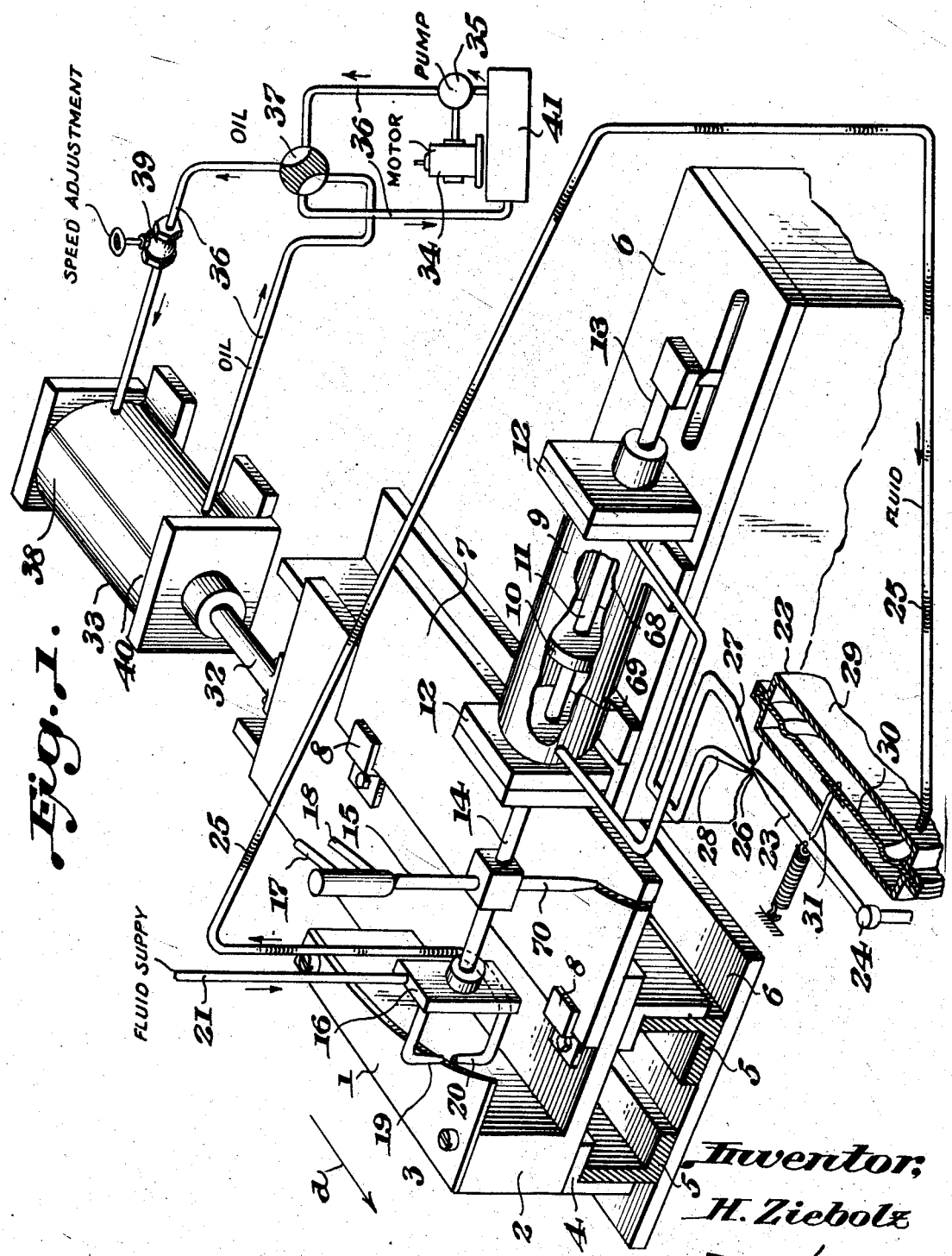

Inventor,
H. Ziebolz
By A. D. Adams
Atty.

Aug. 26, 1941.   H. ZIEBOLZ   2,254,098
PATTERN CONTROLLED MECHANISM FOR TOOLS AND THE LIKE
Filed Nov. 16, 1939   3 Sheets-Sheet 3

Inventor,
H. Ziebolz
By A. D. Adams
Atty.

Patented Aug. 26, 1941

2,254,098

UNITED STATES PATENT OFFICE 2,254,098

PATTERN CONTROLLED MECHANISM FOR TOOLS AND THE LIKE

Herbert Ziebolz, Chicago, Ill., assignor to Askania Regulator Company, Chicago, Ill., a corporation of Illinois Application November 16, 1939, Serial No. 304,829 In Germany November 22, 1938

21 Claims. (Cl. 90—13.5)

This invention relates to pattern or template controlled mechanisms for machine tools and the like, in which the tool must follow a definite contour.

It is an object of the invention to provide a mechanism so designed that a tool is not required to be directly controlled by a pattern or template and thereby prevent any wear on the pattern which would necessarily develop inaccuracies in the contour or shape to be reproduced. It is a further object of the invention to provide a mechanism adjusted and controlled by an "Askania" regulator to operate and guide the tool and which is in turn controlled by a fluid-jet device in cooperation with the pattern.

It is usually not advisable to control and guide a tool directly from a pattern as the forces which are created or must be transmitted are in most cases too great and not only cause wear of the pattern but such forces may prevent an accurate following of the specific pattern to be reproduced. Applicant's mechanism thus includes a hydraulic follow-up device whereby the pattern determines the adjustment of the regulator or relay which latter responds to small displacements. The regulator in turn operates a piston in a power cylinder which operates in such a way by the follow-up mechanism that the movement of the piston is directly proportional to the contour of the pattern and thereby the regulator movement.

The invention aims to provide an improved, simple, reliable and accurate device for controlling a tool from a pattern with intermediate mechanisms for operating the tool so that a "floating" guide will follow the pattern and the latter will not be subjected to the shocks, vibrations and other conditions which result from the cutting or tooling action on the work.

More particularly, the invention utilizes an air jet directed across the pattern to be followed and reproduced and cooperating with a receiving nozzle which latter is connected to the regulator to actuate the mechanism for guiding the tool. The air jet may also operate indirectly on the pattern by means of a vane which latter is guided by the pattern. It is thus a further object of the invention to provide a pair of opposed nozzles, one of which forces a jet of air into a receiving nozzle in cooperation with the pattern which may operate to partly project into the air jet or may contact the edge thereof. The other nozzle, which is a receiving nozzle, will be subject to pressure variations and both nozzles are connected to the piston to control the tool. The mechanism therefore, maintains a constant relative position of the air jet to the pattern and thus establishes the desired follow-up movement. Another object of the invention is to utilize the piston and cylinder at the same time for the movement of the air jet so that the same hydraulic motor controls not only the air supply nozzle, but at the same time, the air receiving nozzle and the tool.

Further aims, objects and advantages of this invention will appear from the following description and the accompanying drawings showing for purely illustrative purposes several embodiments of this invention. It is to be understood, however, that the description is not to be taken in a limiting sense, the scope of this invention being defined in the appended claims.

Referring to the drawings:

Fig. 1 is an isometric view, partly diagrammatic, of the control and operating mechanism as applied to a tool;

Figure 5:
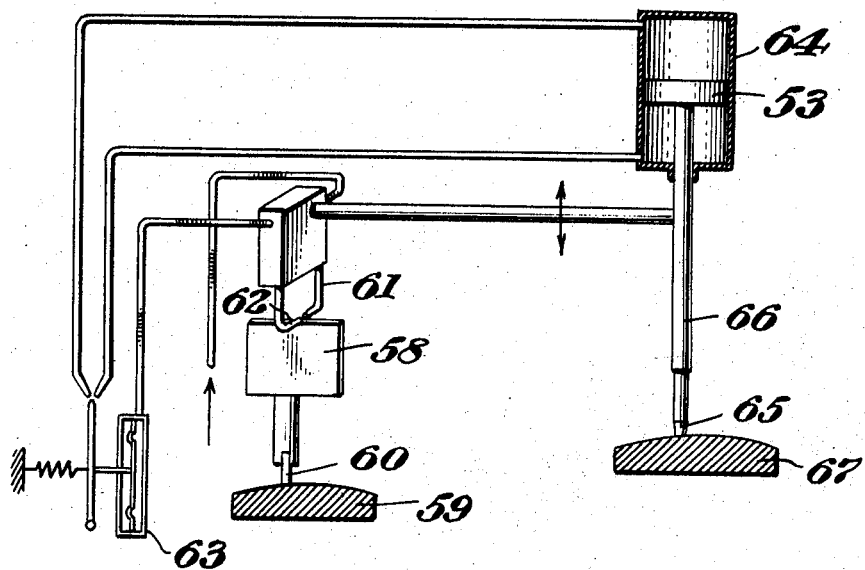
Fig. 5 is a diagrammatic view of a follow-up control for machine tools.

In the construction of Fig. 1, a pattern, template 1 or the like, to be followed or reproduced is of any desired shape and edge contour and may be removably secured to a table slide 2 by any suitable means such as bolts 3. The slide is mounted on angle irons 4 which in turn slide on angle irons 5 secured on a stationary frame or bed 6. The work 7 in the form of a plate out of which the pattern contour is to be cut is also mounted on the slide 2 and is held securely in place by clamps 8 or by any other suitable means.

A cylinder 9 is also mounted on the frame 6 and a double-acting piston 10 is adapted to reciprocate therein by means of a rod 11, which latter is guided in the end plates 12. This rod 11 is guided at one end 13 in the bed 6 and the other end 14 carries a tool 15 and a plate 16.

The tool 15 may comprise any suitable cutting device, such as a narrow milling cutter (not shown), rotated by any suitable means, such as a motor (not shown), or the tool may be a cutting torch 70 having a flexible tube 17 for air and a flexible tube 18 for acetylene.

The plate 16 supports and directs a vertical fluid stream or jet created by the nozzle 19 and received in the nozzle 20. The fluid pressure medium is preferably air supplied by the flexible tube 21 and this air supply must be substantially constant. The air received in the receiving nozzle 20, by means of a flexible tube 25, controls a fluid pressure relay or regulator 22 of the well known "Askania" jet-pipe type which includes a movable jet-pipe 23 pivoted at 24 and supplied with pressure fluid (preferably oil), from a suitable source (not shown). The pressure fluid which issues from the orifice 26 is directed into reception orifices 27 and 28 depending upon the relative position of the jet-pipe nozzle 23. The jet-pipe nozzle 23 is controlled by a differential pressure device comprising a casing 29 separated into two chambers by a diaphragm 30. The movement of the diaphragm is transmitted to the jet-pipe nozzle by means of a link 31.

The table slide 2 may be actuated by means of a hydraulic system including a piston rod 32 secured to the slide and reciprocating in a cylinder 33, which latter is controlled by a motor 34 and pump 35 in pipe communication by means of pipes 36. A four-way valve 37 controls the flow of oil under pressure to the working-stroke end 38 of the cylinder 33 adjusted as to speed by means of valve 39 and at the same time the oil in the return end 40 flows into the tank 41, as indicated by the arrows. After the work piece has been cut, the valve 37 is adjusted to a position at right angles to the position shown to reverse the flow of oil in the pipes between the valve 37 and cylinder 33 to move the table 2 back to its original position.

Figure 3:
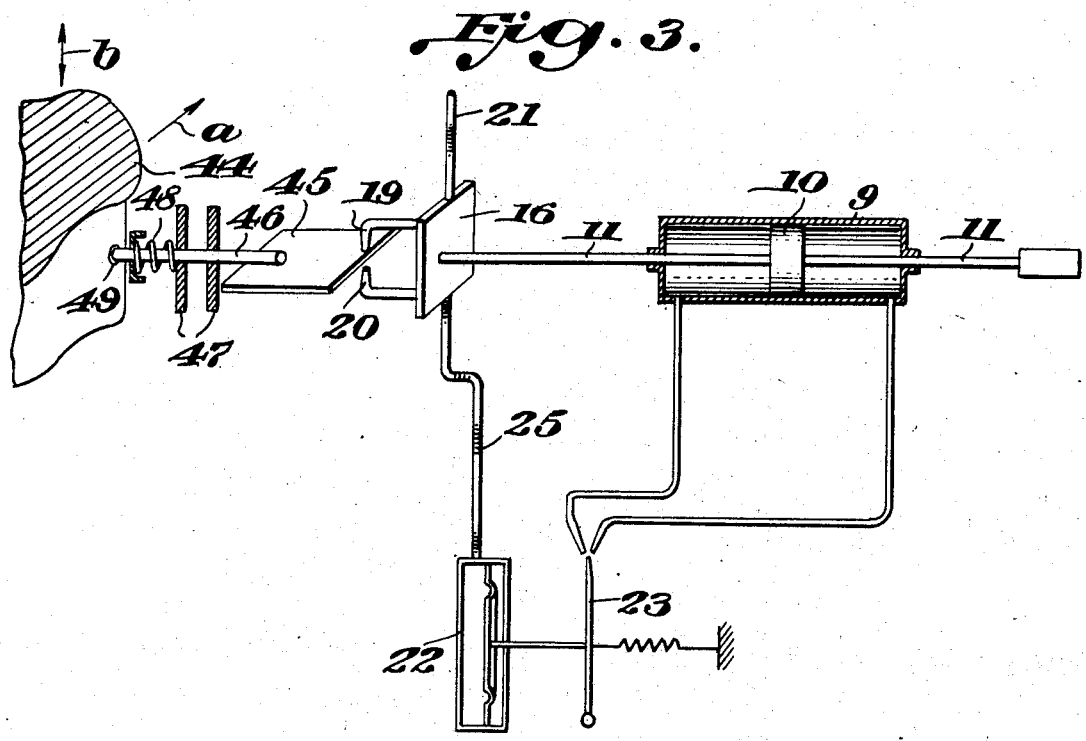
Fig. 3 is a diagrammatic view of a modified construction for a pattern having three dimensions.

The actual shape of the pattern or template is not limited to that shown in Fig. 1, but can comprise any design as for instance, a rotary or continuous template 42, Fig. 3, which is mounted to rotate on a shaft 43 by any suitable means (not shown) and the rotational travel or speed of which is in proportion with the travel of the work. Also, instead of moving the pattern and work, as in Fig. 1, it would be obvious to move the air jet nozzles, the tool and the piston and cylinder with its regulator if desired.

A construction utilizing a three-dimension pattern is illustrated in Fig. 3, in which the pattern 44 moves not only horizontally in the direction of arrow $a$, but also vertically in the direction of the arrow $b$. For such a pattern the nozzles 19 and 20 cannot be utilized directly so that the air jet contacts the pattern, but an additional controlling vane 45 is provided secured on a rod member 46 guided in two bearing members 47. A spring 48 forces the roller 49 in contact with the contour of the pattern 44. The piston 10 will, therefore, follow directly the movement of the roller 49 on the pattern 44 through the intermediary of the vane 45 and any suitable tool (not shown) can be mounted anywhere on the rod 11.

Figure 4:
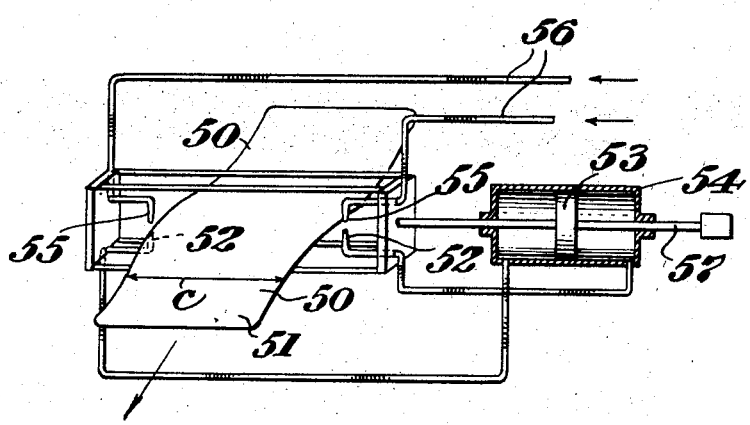
Fig. 4 is a diagrammatic view of a further modified construction utilizing a double pattern.

Fig. 4 illustrates a construction in which it is not necessary to provide a relay or regulator. In this form of the invention, the two edges 50 of the pattern 51 are utilized which cooperate with the two receiving nozzles 52 connected to opposite sides of the piston 53 in cylinder 54. The air supply nozzles 55 both receive air through pipes 56 which is of constant and like pressures. A suitable tool (not shown) may be provided anywhere on the rod 57. In such a structure, it is necessary that the pattern must have two parallel contours 58 with a contant width $c$. The nozzles will follow exactly the contour of the pattern and it would be possible to use only one receiving nozzle if the cylinder 54 and piston 53 were provided with a spring (not shown).

Fig. 5 shows a vane type- follow-up control for a machine tool in which the air jet is directed horizontally instead of vertically. The vane 58 follows the curvature of the pattern 59 by means of a suitable roller 60. The control of the flow of constant pressure air from the nozzle 61 to the nozzle 62 across the edge of the vane changes the pressure in the "Askania" regulator 63, which latter controls the hydraulic pressure in cylinder 64. A tool 65 is connected to the piston rod 66. The part 67 to be machined will be cut exactly to conform with the pattern 59.

The apparatus operates as follows:

Referring to Fig. 1, the motor 34 is started and the valve 39 is set so that the table 2, pattern 1 and the work 7 are moved in the direction of the arrow $d$, the rate of movement of which is dependent upon the cutting rate or speed of the torch 15. Assuming that the proper effective relationship of the pattern and the nozzles 19 and 20 is such that the pattern projects a distance into the air jet of approximately one-half the cross-sectional area thereof, if now the pattern covers less than one-half the cross-sectional area of the air stream, the air pressure in tube 25 will rise so that the pressure in the right hand chamber 29 will also rise to slightly rotate the jet pipe 23 counterclockwise or to the left. This increases the pressure in chamber 68 and decreases the pressure in chamber 69 so that the piston is forced slightly to the left, thereby not only properly guiding the torch 70, but also adjusting the plate 16 so that the edge of the pattern will travel laterally through the air stream through the middle thereof. If, however, the pattern tends to cover more than half the receiving nozzle 20, the pressure in tube 25 decreases so that jet pipe 23 is slightly rotated clockwise or to the right, to increase the pressure in chamber 69 and decrease the pressure in chamber 68 to move the piston 10, rod 14 and torch 70 as well as plate 16 and nozzles 19 and 20 to the right. The regulator 22, therefore, acts as a pressure regulator which maintains, or attempts to maintain, a constant pressure in the flexible tube 25. Also, the plate 16 with the nozzles 19 and 20 maintains a "floating" action relative to the pattern contour in a horizontal direction and effective to maintain a constant pressure on the regulator. This pressure maintains a definite relative position of the nozzles to the pattern and thereby a definite position of the operating tool, the latter being thus guided to definitely reproduce the contour of the pattern or template. The "floating" action of the nozzles relative to the pattern will relieve the pattern from possible detrimental effects of the operating forces of the tool on the work and will make it possible to reproduce the contour of the template on the work with the highest degree of accuracy. Since the pattern is not subject to wear or stresses, it is possible to make the patterns of very thin materials which will decrease the cost of manufacture. Also, the patterns may be subjected to an indefinite number of reproductions and can thus constitute a permanent but interchangeable part of the machine.

Figure 2:
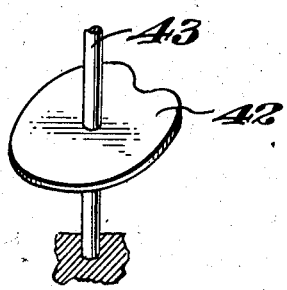
Fig. 2 is a perspective view of a modified form of pattern.

The operation of a machine utilizing a rotary pattern (Fig. 2), will follow similar mode of operation as it is only necessary to provide means for rotating the pattern and to synchronize the rotary speed thereof with the rate of movement of the table 2 with its work and the cutting ability of the tool.

The operations of the mechanisms shown in Figs. 3 to 5 are obvious from the foregoing. In Fig. 3 means are provided to impart the double motion to the pattern 44 in relation to the movement of the work and the cutting ability of the tool. The intermediate parts 49, 46 and finally vane 45, translate the contour of the pattern to the air stream of the nozzles 19 and 20 since obviously it would be rather difficult to directly cooperate the air stream on the pattern. In Fig. 4, the double air streams obviate the necessity of a relay or regulator but it would be possible to use only one set of nozzles and one air stream if the piston 53 is provided with a spring. In Fig. 5, the air stream is directed horizontally and the "floating" action takes place vertically.

It is understood that the invention is not restricted to the control and operation of machine tools but it can also be used in all cases where a movement modification and/or power amplification or translation is desired.

Obviously, the present invention is not restricted to the particular embodiments herein shown and described. Moreover, it is not indispensable that all the features of this invention be used conjointly, since they may be employed advantageously in various combinations and subcombinations.

I claim as my invention:

1. Mechanism of the class described, comprising means for directing a fluid stream under constant pressure including two cooperating spaced nozzles between the ends of which the fluid stream passes from one into the other; a pattern cooperating with the fluid stream; and means cooperating with the nozzles under the control of the pressure in the receiving nozzle to communicate the pressure variations in said receiving nozzle and controlled by the pattern to adjust said last-mentioned means to conform with the configuration of the pattern.

2. Mechanism according to claim 1, in which a regulator is provided intermediate the receiving nozzle and said pattern controlled means.

3. Mechanism of the class described comprising a pair of spaced and opposed nozzles between which a fluid stream under constant pressure passes and of which one nozzle is a receiving nozzle; a pattern adapted to cooperate with the fluid stream; a tool and a device to which the nozzles and the tool are connected and in operative cooperation with the receiving nozzle whereby said device controls the movement of the tool governed by the pattern in such manner that a substantially constant pressure is maintained in the receiving nozzle.

4. Mechanism according to claim 3, in which an intermediate relay is provided between the receiving nozzle and the device.

5. Mechanism according to claim 3, in which means are provided to operate and mount the pattern directly into the fluid stream.

6. Mechanism according to claim 3, in which the pattern has three dimensions, and in which an intermediate contact means and vane are provided wherein the contact means operates directly on the pattern and the vane projects into the fluid stream.

7. Mechanism of the class described comprising two pairs of spaced and opposed nozzles between each pair of opposed nozzles of which a stream of fluid under constant pressure passes and of which one nozzle of each pair is a receiving nozzle; a pattern having two contours parallel to each other and of which each contour projects into an air stream; means for connecting the two pairs of nozzles together; and a device in the form of a double-acting power cylinder with a piston therein connected to the two pairs of nozzles, each receiving nozzle being in communication with one side of the piston, the movement of the piston being controlled by the pattern in such a way that the pressure in the receiving nozzle is maintained substantially constant.

8. A machine tool comprising means for producing a fluid stream under constant pressure; means for receiving the pressure of the fluid stream; a pattern adapted to cooperate with said fluid stream to partially interrupt said stream; a tool; means connected to said tool to move the latter; means connected to the receiving means responsive to the pressure variations caused by the more or less partial interruption of the fluid stream by the pattern to control the means to move the tool; and means for causing relative movement between the pattern and the fluid stream; whereby the tool will duplicate the configuration of the pattern on a work.

9. A machine tool comprising a frame; a table slidably mounted on said frame and adapted to receive a work piece; a template adapted to be removably secured on the table; a double-acting piston and cylinder mounted on the frame; a tool connected to and guided by the piston; a pair of opposed nozzles arranged in spaced relation and connected to the piston and tool, one of said nozzles receiving fluid under a constant pressure and projecting it as a stream of fluid into the other nozzle and into the path of the contour of the template; and means for operatively connecting the said other nozzle with the cylinder whereby variations of fluid pressure in said other nozzle dependent upon a more or less projection of the template into the fluid stream will cause adjustment of the piston and the work piece corresponding to the contour of the template.

10. A machine tool according to claim 9, in which hydraulic means are provided to slide the table during the operation of the tool.

11. A machine tool according to claim 9, in which a jet-type relay is provided intermediate the said other nozzle and the cylinder responsive to pressure variations in the said other nozzle.

12. A machine tool comprising a frame; a table slidably mounted on said frame and adapted to receive a work piece; a template adapted to be removably secured on the table; a double-acting piston and cylinder mounted on the frame; a piston rod for the piston; a tool mounted on the piston rod; a pair of opposed nozzles arranged in spaced relation and mounted on the piston rod, one of said nozzles projecting fluid under constant pressure as a stream toward and into the other nozzle and the contour of the template projecting into the fluid stream; a regulator responsive to variations of the fluid pressure in the receiving nozzle dependent upon a more or less projection of the template into the fluid stream and connected with both sides of the piston to adjust the piston, tool and nozzles dependent upon the contour of the template whereby the tool will cut the work-piece corresponding to the contour of the template; and means for drawing the template along the fluid stream and the tool over the work piece.

13. A machine tool comprising means for producing a fluid stream under a constant pressure and including means for receiving the pressure of the stream; a tool; a pattern having its contour intercepting a portion of the fluid stream; and means for mounting said first-named means whereby the fluid stream will follow a floating guide action relative to the pattern, to adjust and guide the tool on the work dependent upon the contour of the pattern and the pressure of the received fluid stream.

14. A machine tool comprising means for projecting and receiving a fluid stream; a tool; a pattern cooperating with the fluid stream; means for moving said pattern and a work piece relative to the fluid stream and tool; and means for mounting said first-named means whereby the fluid stream will follow a floating action relative to the pattern to adjust and guide the tool on the work piece dependent upon the pattern and the pressure of the received fluid stream.

15. A machine tool comprising a pair of opposed nozzles spaced apart to project and receive a fluid stream; a tool; a pattern cooperating with the fluid stream; a hydraulic device for guiding the tool; and means responsive to the pressure of the fluid in the receiving nozzle controlled by the pattern to operate the hydraulic device so that the tool will follow the contour of the pattern.

16. A machine tool according to claim 14, in which the contoured portion of the pattern to be reproduced partially intercepts the fluid stream.

17. A machine tool comprising a pair of opposed nozzles spaced apart and of which one nozzle receives fluid under constant pressure and forces it as a stream toward and into the other nozzle; a rod on which the nozzles are mounted; a pattern cooperating with the fluid stream to block a portion of the fluid stream; a piston and cylinder cooperating with the rod and the piston moving with the nozzles; a tool operatively guided by the piston; and means communicating the cylinder with the receiving nozzle whereby upon variations in pressure due to the contour of the pattern the piston will adjust the fluid stream and the tool so that the tool will follow the contour of the pattern.

18. A machine tool for reproducing the contour of a pattern on a work piece comprising means for supporting the pattern and the work piece; a pair of opposed nozzles spaced apart to project a fluid under constant pressure from one nozzle and receive the pressure of the projected fluid stream in the other nozzle the contour of the pattern projecting into the path of the fluid streams; pressure responsive means connected to the nozzles and movable relative to the pattern; and means responsive to the pressure in the receiving nozzle to operate the pressure responsive means so that the pair of nozzles will follow the contour of the pattern.

19. A machine tool according to claim 18, in which operating means is connected to produce relative movement between the nozzles and the means for supporting the pattern and work.

20. A machine tool for reproducing the contour of a pattern on a work piece comprising means for supporting the pattern and the work piece; a pair of opposed nozzles spaced apart to project a fluid under constant pressure from one nozzle and receive the pressure of the projected fluid stream in the other nozzle; pressure responsive means connected to the nozzles and movable relative to the pattern; means responsive to the pressure in the receiving nozzle to operate the pressure responsive means so that the pair of nozzles will follow the contour of the pattern; and intermediate parts including a vane which partly projects into the fluid stream and which parts follow and contact the contour of the pattern to be reproduced.

21. In a machine tool for reproducing the contours of a pattern, two pairs of opposed nozzles of which the two opposed nozzles of each pair consists of one nozzle which projects a fluid under constant pressure and the other nozzle receives the projected fluid stream thus forming a pair of spaced fluid streams, a pattern having a pair of contours of which each contour projects more or less into the respective fluid streams, means for connecting the two pairs of opposed nozzles in spaced relation, and means for shifting the two pairs of opposed nozzles relative to the pattern in response to pressure variations in the receiving nozzles.

HERBERT ZIEBOLZ.